United States Patent [19]

Sand

[11] Patent Number: 4,666,176
[45] Date of Patent: May 19, 1987

[54] TRAILER HITCH GUIDE

[76] Inventor: Kenneth E. Sand, P.O. Box 952, Burnsville, N.C. 28714

[21] Appl. No.: 723,188

[22] Filed: Apr. 15, 1985

[51] Int. Cl.$^4$ .............................................. B60D 1/06
[52] U.S. Cl. ...................................... 280/477; 33/264
[58] Field of Search .................. 280/477; 33/264, 293; 116/28 R

[56] References Cited

U.S. PATENT DOCUMENTS

| | | | |
|---|---|---|---|
| 3,015,162 | 1/1962 | Bohnet | 33/264 |
| 3,159,917 | 12/1964 | Whitehead | 33/264 |
| 3,363,318 | 1/1968 | Folkins et al. | 33/264 |
| 3,702,029 | 11/1972 | Anderson, Jr. | 33/246 |
| 3,765,703 | 10/1973 | Voelkerding | 280/477 |
| 3,818,599 | 6/1974 | Tague | 33/264 |
| 4,114,220 | 9/1978 | Pfister | 33/293 |
| 4,541,183 | 7/1985 | McConnell | 116/28 R |
| 4,583,481 | 4/1986 | Garrison | 116/28 R |

Primary Examiner—John J. Love
Assistant Examiner—Donn McGiehan
Attorney, Agent, or Firm—Thaddius J. Carvis

[57] ABSTRACT

A device for assisting in vertically, longitudinally and laterally aligning two coupling members, one associated with a towing vehicle and the other associated with a towed vehicle, comprises a first sight member for positioning substantially perpendicularly directly over one coupling member and a second sight member for positioning substantially perpendicularly directly over the other coupling member, one sight member having a shaped portion permitting alignment to be achieved while the sight members are positioned over their respective coupling members. A memory device is provided for slidably mounting on one of the sight members to record the vertical distance of a coupling member from a common surface.

8 Claims, 4 Drawing Figures

U.S. Patent May 19, 1987 4,666,176
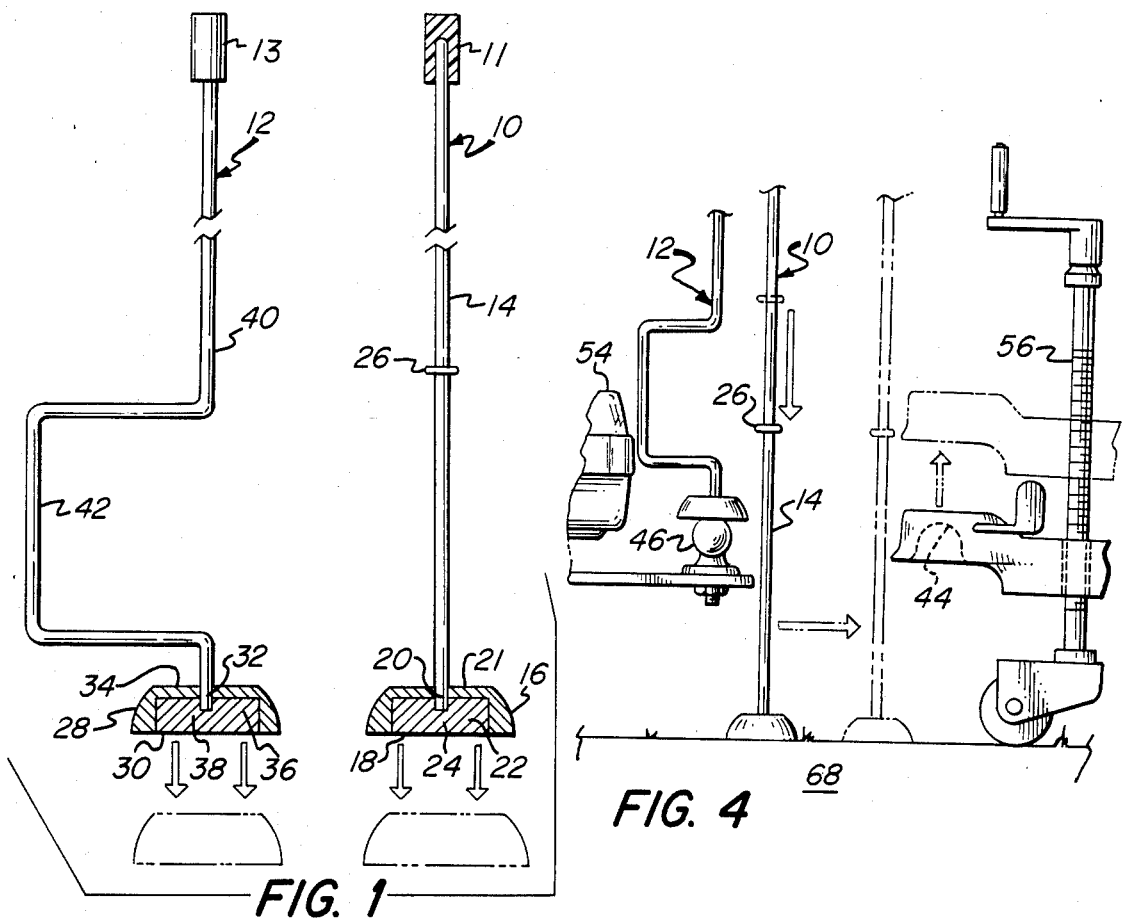
FIG. 1
FIG. 4
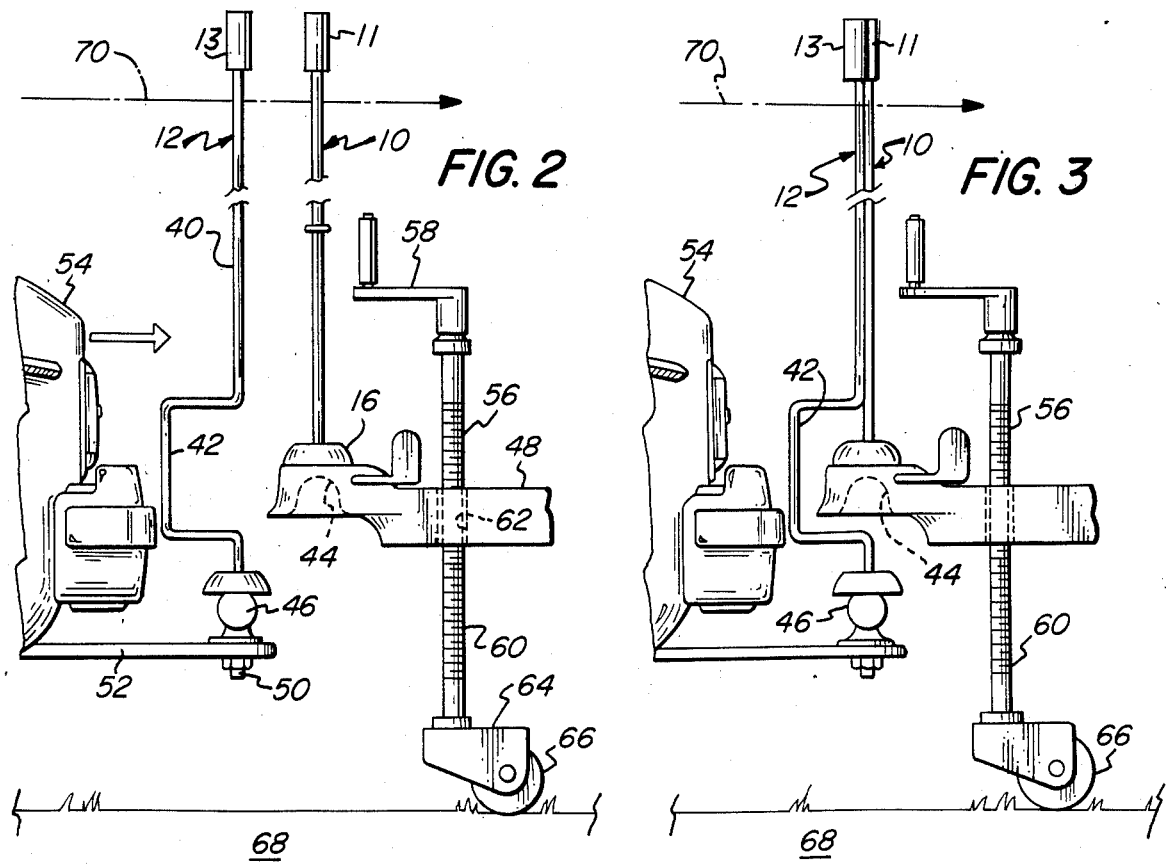
FIG. 2
FIG. 3

TRAILER HITCH GUIDE

BACKGROUND OF THE INVENTION

(1) Field of the Invention

The present invention relates to a trailer hitch guide for aiding an automobile driver in positioning an automobile so that a coupling member associated with the automobile is aligned with a coupling member associated with a trailer to be towed. More specifically, the present invention relates to a trailer hitch guide for assisting in vertical, lateral, and longitudinal alignment of the automobile and trailer coupling members.

(2) Discussion of The Prior Art

Trailer hitch guides assist a driver in single-handedly maneuvering an automobile so that an automobile coupling member, ordinarily a hitch ball mounted upright adjacent the rear of an automobile or other towing vehicle, is positioned to mate with a trailer coupling member, ordinarily an inverted socket mounted facing downward in the hitch arm or tongue of the trailer. The correct mating position, or alignment, must be accomplished in a vertical, lateral, and longitudinal direction. Specifically, the ball must be below but adjacent the socket (vertical alignment), the ball must not be to either the left or right of the socket (lateral alignment), and the ball must not be either in front of or behind the socket (longitudinal alignment). The ball and socket are relatively small, and the task is further complicated because the driver ordinarily cannot see either coupling member from the driver compartment, when the members are within coupling range. If the driver is unskilled, the alignment operation can be very time consuming and frustrating, with much trial and error. And, even when the driver is highly skilled, such as a driver who regularly performs hitching operations as part of a business, several attempts and adjustments are typically necessary, significantly lowering efficiency.

Conventional trailer hitch guides employ visual aids associated with the automobile and trailer to help the driver align the coupling members. Various means are used to mount the visual aids on the vehicles to disclose to the driver the position of the ball relative to the socket. By maneuvering the automobile while observing the visual aids, the driver tries to move the ball into position under the socket with as few maneuvers as possible.

Prior art trailer guides are variously complex, difficult to install, or awkward to adjust, maintain, and use. Furthermore, the conventional guides may not transfer easily from one automobile-trailer pair to another, nor remove conveniently for storage. No prior art trailer guide combines the desirable features of simplicity, durability, ease of use, and economy of manufacture.

Tague U.S. Pat. No. 3,818,599 discloses two sighting components, each component consisting of a base having a magnet embedded in its bottom face, and an elongated extensible and contractible supporting rod mounted in the base. Each base is positioned on a metallic surface in the vicinity of the associated coupling assembly, and the tip of each rod is positioned directly above the associated coupling member at a predetermined distance above the ground. The driver moves the car until the tips coincide.

The Tague system is hard to operate. Because each base is mounted on a magnetic surface only adjacent the coupling member, rather than directly on or over the coupling member, the rod must be inclined so that the tip overhangs the coupling member. To position the tip directly over the coupling at a predetermined vertical distance calls for careful and time consuming adjustments, and a plumb line would appear necessary to get the precise positioning required. Also, the driver, while looking rearwardly, must move the automobile until the tips of the rods meet. This requires the driver to align two relatively small points, an awkward task at best. Furthermore, the sighting components of Tague are complex, requiring a telescopic rod and a machined base having means for allowing the rod to swing fore and aft for overhanging the coupling members.

Bohnet U.S. Pat. No. 3,015,162 discloses a sight member mounted over the hitch ball and a corresponding sight member mounted over the socket. A first sight member is supported by a bendable bracket having two legs at an approximate right angle. One leg is substantially horizontal and has a number of holes spaced along its length for receiving the first sight member, the member being placed in the hole most directly over the ball with the leg being bent as necessary to achieve the best alignment. The other, substantially vertical, leg of the bracket has a magnet for attaching the bracket to a car bumper. A second sight member is affixed by means of a bendable bracket to another magnet for positioning over the trailer socket.

The Bohnet device requires a number of adjustments for use. The sight member associated with the automobile is not mounted directly on the hitch ball, but rather on some metallic surface nearby, such as the bumper. The bracket must be properly bent and the correct hole selected for alignment of the sight member, and such alignment is unlimited by the number and spacing of the holes. Accordingly, the alignment over the hitch ball can be difficult to achieve. Proper alignment over the socket likewise depends on the bracket being properly bent and the magnet properly positioned. Therefore it is seen that adjustment of the sight members can not only be awkward and time consuming for a single trailer-towing vehicle pair, but can result in fatigue and failure where the device is employed for a number of such pairs, especially in a commercial setting.

Voelkerding et al. U.S. Pat. No. 3,765,703 discloses a hitch guide member mounted on the rear of an automobile, the guide having legs that diverge on either side of the hitch ball. The guide member can be adjusted heightwise. Two sighting members are placed on the guide member, one on each leg. A third sighting member is mounted above the socket on the trailer. The sighting members assist the driver in raising the socket to the proper height by means of a jack and subsequently in moving the car rearwardly so that the socket is guided into position between the guide member legs, the legs then forcibly guiding the socket member into final position.

The Voelkerding device is relatively difficult to build and install, requiring a number of parts, some of which are welded together. A mount for the hitch guide member must be attached to the automobile, and the hitch guide member therefore cannot be readily transferred to another vehicle without a corresponding mount. The sighting member on the socket is secured by means of a clip. Neither of the three sighting components is readily transferrable to another vehicle.

Whitehead U.S. Pat. No. 3,159,917, Folkins U.S. Pat. No. 3,363,318, and Anderson U.S. Pat. No. 3,702,029 all disclose complex and unwieldy mechanisms difficult to install, adjust, and use. The devices involve many parts, some of which must move with respect to others. Special tools are required for installation and maintenance. The complexity of these devices can be readily appreciated from a cursory review of FIGS. 1 through 13 of Whitehead, FIGS. 1 through 7 of Folkins, and FIGS. 1 through 4 of Anderson.

Whitehead discloses an elevation measuring device for gauging the height to which the socket must be raised to engage the ball. A rod is frictionally mounted to the side of the trailer and can be slid up and down to gauge the height of the trailer. A piece of tape is used to mark the proper height of the trailer on the rod before the trailer and automobile are separated. When re-coupling is desired, the proper height will still be recorded on the rod, and the socket can be raised accordingly. However, Whitehead contemplates that the proper height be recorded on the measuring rod before the vehicles are separated and does not disclose a method for adjusting the socket height without the pre-recording step.

SUMMARY OF THE INVENTION

A trailer hitch guide in accordance with one aspect of the present invention includes two position indicators, one mounted directly on the surface of the trailer coupling member and the other mounted directly on the surface of the automobile coupling member.

In accordance with a first aspect of the present invention, each position indicator comprises a base for holding an elongated sighting member upright directly over the coupling member. Each base includes means for removably holding it directly on the surface of the coupling member, and also permitting adjustable positioning of the base over the coupling member. Each base supports its associated elongated sighting member upright, which the user aligns over the coupling member simply by orienting the base. For removal and transfer to another vehicle or for storage, the position indicators are expeditiously manually lifted off the coupling member surface. The elongated members are preferably manually removable from their respective bases for convenient storage. The position indicator placed on the automobile coupling has a shaped portion along its lower end permitting the trailer coupling to be aligned over the automobile coupling without disturbing the position indicator on either coupling member. While maneuvering the automobile, the driver observes the two position indicators until they coincide, thereby achieving lateral and longitudinal alignment of the coupling members.

In accordance with a second aspect of the present invention, a memory device is slidably mounted on one of the elongated members. When this elongated member with memory device is placed adjacent the automobile coupling member, with the elongated member being supported upright by the base placed on the surface supporting the automobile, the height of the automobile coupling member can be recorded by sliding the memory element up or down to the corresponding position. The elongated member can then be moved up or down to achieve vertical alignment.

Additional advantages of a trailer hitch guide in accordance with the present invention will be apparent from the detailed description of the invention with reference to the drawings.

BRIEF DESCRIPTION OF THE DRAWINGS

FIGS. 1, 2, 3, and 4 are four different views of the trailer hitch guide in accordance with the present invention.

FIG. 1 shows the two position indicators side by side;

FIG. 2 shows the two position indicators mounted on an automobile coupling and a trailer coupling, the couplings being aligned vertically, but not laterally or longitudinally;

FIG. 3 shows the two position indicators mounted on an automobile coupling and a trailer coupling, the couplings being aligned vertically, laterally, and longitudinally; and FIG. 4 shows one position indicator with a slidable memory element placed adjacent the automobile coupling for recording the height of the automobile coupling above the ground, and the same position indicator shown in broken lines placed adjacent the trailer coupling for vertical positioning of the trailer coupling.

DETAILED DESCRIPTION OF THE INVENTION

FIG. 1 shows the two position indicators of the present invention denoted generally as 10 and 12. The first position indicator 10 comprises a first elongated sighting member, shown as rod 14, and first base 16. The rod 14 as shown in FIG. 1 has a predetermined length sufficient to extend upwardly to the line of sight from the driver's compartment. A sighting aid, such as cap 11, is placed on top of rod 14. This sighting aid is preferably made to be highly visible, such as formed from a light reflective material for night use, and could equally well be a ball or a flag. Rod 14 is shown as straight along its entire length, but it is understood that rod 14 needs only a straight portion along its upper length for alignment over the coupling members. Rod 14 has a lower end for mating with the base 16 and an upper end for viewing by the driver.

Rod 14 is cylindrical with a circular cross section and a longitudinal axis, although it is understood that rod 14 can be any elongated member for observation by the driver. Rod 14 can be formed from any suitable material, such as plastic, wood, or metal, aluminum being a preferred metal. Rod 14 is small enough to be portable.

Base 16 supports rod 14 in an upright position. The base 16 as shown in FIG. 1 comprises a body of wood, metal, plastic or other suitable material with a bottom surface 18 for resting on the top surface of a coupling member.

Base 16 has a chamber 20 opening onto its top surface 21, the chamber 20 formed for receiving the lower end of rod 14. In FIG. 1, chamber 20 is a hole of circular cross section formed in the top of base 16 for receiving the rod 14. Chamber 20 is oriented so that the rod 14 when inserted into chamber 20 is substantially perpendicular to the bottom surface 18. Chamber 20 permits the rod 14 to be removably secured to the base, enabling it to be pushed or pulled manually into or out of the chamber 20 for portability and convenience in assembly or storage.

The base 16 has a second chamber 22 opening onto the bottom surface 18. Chamber 22 contains a permanent magnet 24, which can be secured into base 16 by means of adhesive, such as an epoxy, or other suitable retaining means. Magnet 24 is preferably formed to comprise a part of the bottom surface 18 or base 16.

The magnet 24 removably holds base 16 onto the top surface of a coupling member, while at the same time permitting base 16 to be slidable or adjustably positioned at will over the surface of the coupling member. This adjustable positioning means allows the rod 14 to be positioned directly over the coupling member in an upright position, with the longitudinal axis of the rod 14 substantially coinciding with the axis of the coupling member and substantially perpendicular to the top surface of the coupling member. Also, permanent magnet 24 makes the base 16 and therefore the position indicator portable, because the base 16 can be readily pulled off the coupling surface by hand.

Slidably mounted on the rod 14 is a memory device 26. In FIG. 1 the memory device 26 is a ring of rubber that grippingly engages the rod 14 for sliding up and down the rod 14. Once slid to a position on the rod 14, the memory device 26 grips the surface of the rod 14 to hold its position and therefore can be used to record distance. It is understood that in accordance with the present invention a memory device other than a ring of rubber could be used. For example, a metal clip could be frictionally mounted on rod 14. Also, the memory device could be mounted on the second position indicator as well.

FIG. 1 further shows the second position indicator 12 with sighting aid 13 mounted thereon. The base 28 of the position indicator 12 is constructed similarly to base 16 of position indicator 10. The base 28 has a bottom surface 30, a top chamber 32, a top surface 34, a bottom chamber 36, and a permanent magnet 38.

Additionally, as can be seen from FIG. 1, the position indicator 12 has a second elongated sighting member, shown as rod 40, having a shaped portion 42, for extending around the trailer coupling when the trailer coupling is positioned over the automobile coupling. In FIG. 1, the rod 40 is of circular cross section with four 90° bends at the shaped portion for extending around the trailer coupling.

It is understood that the rod 40 can be any elongated member having a straight portion along its upper end for alignment and viewing by the driver, and the shaped portion 42 need not comprise 90° bends, but rather could have any shape, such as a circular bend, to avoid the trailer coupling when aligned over the automobile coupling. This shaped portion permits simultaneous alignment of the position indicator over both the automobile and trailer couplings when the couplings are aligned. The composition of rod 40 is similar to that of rod 10, aluminum being a preferred material.

In order to achieve proper alignment for coupling, the trailer coupling member must be aligned with the automobile coupling member vertically, laterally, and longitudinally. Proper vertical alignment means that the trailer coupling is above but adjacent to the automobile coupling, so that the trailer coupling can be lowered onto the automobile coupling. FIGS. 2 and 3 demonstrate how the position indicators 10 and 12 of FIG. 1 are used to achieve lateral and longitudinal alignment. FIG. 4 shows how the position indicator 10 with memory element 26 is used to achieve vertical alignment.

FIG. 2 is a side view showing the position indicators 10 and 12 mounted on a trailer coupling member 44 and an automobile coupling member 46. FIG. 2 shows the two coupling members in an unaligned or unmated position with respect to longitudinal alignment, the trailer coupling member 44 being "behind" the automobile coupling member. For the sake of simplicity, lateral alignment is not shown in this view, although it is understood that a front view would show the trailer coupling 44 either to the left or right of the automobile coupling 46. The automobile coupling 46 and the trailer coupling 44 are shown already in vertical alignment. The achievement of this vertical alignment is discussed below with respect to FIG. 4.

The trailer coupling member 44 shown in FIG. 2 is an inverted socket mounted in a metal trailer tongue 48. The trailer is not shown. The socket 44 is shown by a dotted line representing the chamber in the tongue 48 that receives the automobile coupling member 46, which is shown as a metal ball 46. The ball 46 is connected by bolt 50 to plate 52, which is connected to the automobile 54 (partially shown).

Also shown in FIG. 2 is a jack assembly 56, used for raising or lowering the tongue 48 and with it the socket 44. The trailer jack assembly 56 comprises a crank 58 mounted on a threaded shaft 60, which passes through a threaded portion 62 associated with tongue 48. The threaded shaft 60 terminates in a structure 64 comprising a wheel 66, which rests on the ground 68 and supports the tongue 48. Vertical adjustment of tongue 48 is achieved by turning the crank 58.

FIG. 2 further shows the position indicators 10 and 12 mounted over the socket 44 and on the ball 46 as contemplated by the present invention. The base 16 of position indicator 10 is placed on the top surface of the tongue 48 directly over the socket 44. The base 16 is positioned so that the rod 14 extends upwardly substantially perpendicular to and aligned over the socket 44. Because the base 16 has a bottom surface 18 with permanent magnet 24 for holding the base to the metal tongue 48, the base 16 can be slidably adjusted about the surface of the tongue 48 until the rod 14 is aligned laterally and longitudinally with the socket 44.

Although a top view of this system is not shown, it can be appreciated that the rod 14 can be aligned both laterally and longitudinally with socket 44, so that a driver sitting in the driver seat of the automobile 54 and looking rearwardly along the line of sight 70 can observe the lateral and longitudinal position of socket 44 by observing the top portion of the rod 14.

In FIG. 2 the position indicator 12 is placed above the ball 46, the base 28 having its bottom surface 30 in contact with the top of the ball 46. The straight portion of the rod 40, which is above the shaped portion 42, can be aligned laterally and longitudinally over the center of the ball 46 in the same manner that position indicator 10 was aligned over the socket 44. Because the base 28 has a permanent magnet 38 and a bottom surface 30, the base 28 can be adjustably positioned on the surface of the ball 46 so that the rod 40 is aligned both laterally and longitudinally with the ball 46. The top portion of the rod 40 is visible by the driver along the line of sight 70.

The driver of the automobile can then proceed to maneuver the automobile, and with it the ball 46 until the rods 14 and 40 coincide along their upper lengths, as is seen in FIG. 3. The driver then knows that the socket 44 is both laterally and longitudinally aligned with the ball 46. The driver can then stop the automobile and proceed to lower the socket 44 onto the ball 46.

FIG. 3 shows the socket 44 in alignment with the ball 46, and also shows the function of the shaped portion 42 of the elongated member 40. By forming the elongated member 40 to extend around the trailer coupling member when it is aligned with the automobile coupling member, both position indicators 10 and 12 can remain in place until the desired alignment is achieved.

FIG. 4 shows how vertical alignment of the socket 44 with the ball 46 is achieved. In FIG. 4, the position indicator 10 is shown placed on the ground 68 supporting the automobile and the trailer, the indicator 10 adjacent the ball 46 and substantially perpendicular to the ground 68. The position indicator 12 is shown mounted atop the ball 46. By sliding the memory device 26 along the rod 14, the height of the opening for the socket 44 can be recorded on the rod 14.

The position indicator 10 with the memory device 26 appropriately positioned is then transferred to the ground 68 adjacent the socket 44. FIG. 4 shows this second position in dotted lines. Using the jack assembly 56 the socket 44 is then raised or lowered so that it corresponds with the distance recorded on the rod 14, thereby achieving vertical alignment of the two coupling mechanisms.

Although the invention disclosed here has been described in terms of an automobile and trailer, it is understood that the invention applies equally well to other vehicles to be coupled where two coupling members must be aligned. It should be understood that although specific embodiments of the invention have been described herein in detail, such description is for purposes of illustration only and modifications may be made thereto by those skilled in the art within the scope of the invention.

I claim:

1. A trailer hitch guide for aligning a trailer socket and a towing vehicle ball, the guide comprising:
   (A) a first position indicator comprising
      (i) a first elongated member for attachment directly over the trailer socket in an upright position with the longitudinal axis of the first elongated member substantially coinciding with the vertical axis of the trailer socket, the first elongated member having a length at least sufficient for viewing from the driver's compartment of the vehicle;
      (ii) a first base, having means for holding the first elongated member upright;
      (iii) detachable means for securing the first base to the trailer socket; and
   (B) a second position indicator comprising
      (i) a second elongated member for attachment directly over the towing vehicle ball, the second elongated having an upper straight portion substantially coinciding with the vertical axis of the towing vehicle ball, the second elongated member further having a lower shaped portion, the shaped portion deviating from the longitudinal axis of the second elongated member straight portion such that the shaped portion extends around the trailer socket when the trailer socket is aligned with the towing vehicle ball, the second elongated member having a length at least sufficient for viewing from the driver's compartment of the towing vehicle;
      (ii) a second base having means for holding the second elongated member upright; and
      (iii) detachable means for securing the second base to said towing vehicle ball.

2. The trailer hitch guide of claim 1, further comprising means for slidably mounting on the first or second elongated member for recording distance along the first or second elongated member.

3. The trailer hitch guide of claim 1 wherein both bases have chambers in their bottom surface and the detachable means for securing the bases comprise permanent magnets inside the chambers.

4. The trailer hitch guide of claim 3 wherein the elongated members comprise aluminum rods.

5. The trailer hitch guide of claim 4 wherein the bases comprise a plastic.

6. The trailer hitch guide of claim 5, further comprising sighting aid means mounted on the elongated members for viewing from the driver's compartment.

7. a method for aligning a trailer socket with a towing vehicle ball using a trailer hitch guide, said guide comprising a first position indicator having a first elongated member for attachment directly over said trailer socket in an upright position with the longitudinal axis of said first elongated member substantially coinciding with the vertical axis of said trailer socket, said first elongated member having a length at least sufficient for viewing from the driver's compartment of the vehicle, said first position indicator having a first base means for holding the first elongated member upright, said first base means having detachable means for securing said first base means to said trailer socket; and a second position indicator having a second elongated member for attachment directly over said towing vehicle ball, said second elongated member having an upper straight portion, the longitudinal axis of said straight portion substantially coinciding with the vertical axis of said towing vehicle ball, said second elongated member further having a lower shaped portion, said shaped portion deviating from the longitudinal axis of said second elongated member straight portion such that said shaped portion extends around said trailer socket when said trailer socket is aligned with said towing vehicle ball, said second elongated member having a length at least sufficient for viewing from the driver's compartment of said towing vehicle, said second position indicator having a second base means for holding said second position indicator upright, said first base means having detachable means for securing said second base means to said towing vehicle ball; said guide having means for slidably mounting on said first or second elongated member for recording distance along said first or second elongated member; said trailer and said towing vehicle resting on a common surface, said method comprising:
   (a) extending said first elongated member perpendicularly upward from the common surface adjacent the towing vehicle ball;
   (b) sliding said recording means along the first elongated member to a position corresponding to the distance from the common surface to said towing vehicle ball, the distance thereby recorded on said first elongated member;
   (c) extending said first elongated member with said slidable recording means having recorded the distance thereon perpendicularly upward from the common surface adjacent said trailer socket;
   (d) moving said trailer socket to a position corresponding to said recording means on the first elongated member;
   (e) attaching said first elongated member on the surface of said trailer socket in alignment with the vertical axis of said trailer socket;
   (f) attaching said second elongated member on the surface of said towing vehicle ball;

such that said upper section is in alignment with the vertical axis of said towing vehicle ball; and (g) moving said towing vehicle ball with said second elongated member thereon until said first and second elongated members are aligned.

8. a method for aligning trailer socket with a towing vehicle ball using a trailer hitch guide, said guide comprising a first position indicator having a first elongated member for attachment directly over said trailer socket in an upright position with the longitudinal axis of said first elongated member substantially coinciding with the vertical axis of said trailer socket, said first elongated member having a length at least sufficient for viewing from the driver's compartment of the vehicle, said first position indicator having a first base means for holding the first elongated member upright, said first base means having detachable means for securing said first base means to said trailer socket; and a second position indicator having a second elongated member for attachment directly over said towing vehicle ball, said second elongated member having an upper straight portion, the longitudinal axis of said straight portion substantially coinciding with the vertical axis of said towing vehicle ball, said second elongated member further having a lower shaped portion, said shaped portion deviating from the longitudinal axis of said second elongated member straight portion such that said shaped portion extends around said trailer socket when said trailer socket is aligned with said towing vehicle ball, said second elongated member having a length at least sufficient for viewing from the driver's compartment of said towing vehicle, said second position indicator having a second base means for holding said second position indicator upright, said first base means having detachable means for securing said second base means to said towing vehicle; said method comprising:

(a) attaching said first elongated member on the surface of said trailer socket in alignment with the vertical axis of said trailer socket;

(b) attaching said second elongated member on the surface of said towing vehicle ball;

such that said upper portion of said second elongated member is in alignment with the vertical axis of said towing vehicle ball; and said (c) moving said towing vehicle ball with said second elongated member thereon until said first and second elongated members are aligned.

* * * * *